United States Patent
Kondo et al.

(10) Patent No.: US 8,542,245 B2
(45) Date of Patent: Sep. 24, 2013

(54) IMAGE FEATURE DETECTION APPARATUS, IMAGE FEATURE DETECTION METHOD, AND STORAGE MEDIUM

(75) Inventors: Tetsujiro Kondo, Tokyo (JP); Tetsushi Kokubo, Kanagawa (JP); Kenji Tanaka, Kanagawa (JP); Hitoshi Mukai, Kanagawa (JP); Hirofumi Hibi, Kanagawa (JP); Kazumasa Tanaka, Chiba (JP); Takuro Ema, Tokyo (JP); Hiroyuki Morisaki, Tokyo (JP)

(73) Assignee: Sony Corporation, Tokyo (JP)

( * ) Notice: Subject to any disclaimer, the term of this patent is extended or adjusted under 35 U.S.C. 154(b) by 1064 days.

(21) Appl. No.: 12/412,973

(22) Filed: Mar. 27, 2009

(65) Prior Publication Data

US 2009/0251482 A1  Oct. 8, 2009

(30) Foreign Application Priority Data

Apr. 3, 2008  (JP) ................. 2008-097509

(51) Int. Cl.
*G09G 5/02* (2006.01)
(52) U.S. Cl.
USPC ........... 345/590; 345/589; 345/592; 345/619; 345/629; 345/634; 382/162; 382/164
(58) Field of Classification Search
None
See application file for complete search history.

(56) References Cited

U.S. PATENT DOCUMENTS

| 6,411,339 | B1 | 6/2002 | Akutsu et al. |
| 7,071,953 | B2* | 7/2006 | Matsuoka et al. ............ 345/629 |
| 7,551,771 | B2* | 6/2009 | England, III .................. 382/154 |
| 7,881,559 | B2* | 2/2011 | Park et al. ..................... 382/284 |
| 8,249,305 | B2* | 8/2012 | Kondo et al. ................. 382/107 |
| 2003/0002095 | A1* | 1/2003 | Gruzdev et al. .............. 358/518 |

FOREIGN PATENT DOCUMENTS

| JP | 10-164435 | 6/1998 |
| JP | 2000-261794 | 9/2000 |
| JP | 2003-219346 | * 7/2003 |
| JP | 2005-182098 | 7/2005 |
| JP | 2006-157916 | 6/2006 |
| JP | 2007-49529 | 2/2007 |

* cited by examiner

*Primary Examiner* — Antonio A Caschera
(74) *Attorney, Agent, or Firm* — Oblon, Spivak, McClelland, Maier & Neustadt, L.L.P.

(57) ABSTRACT

An image processing apparatus includes: an amount-of-feature detection section configured to determine an amount of features of a first image and an amount of features of a second image, the first image and the second image containing the same subject; an elimination-area detection section configured to eliminate, from the second image, an area in which the amount of features extracted by the amount-of-feature detection section is larger than a predetermined threshold and to provide the second image in which the eliminated area is transparent; and an image combination section configured to superimpose the second image in which the eliminated area is transparent on the first image.

11 Claims, 14 Drawing Sheets

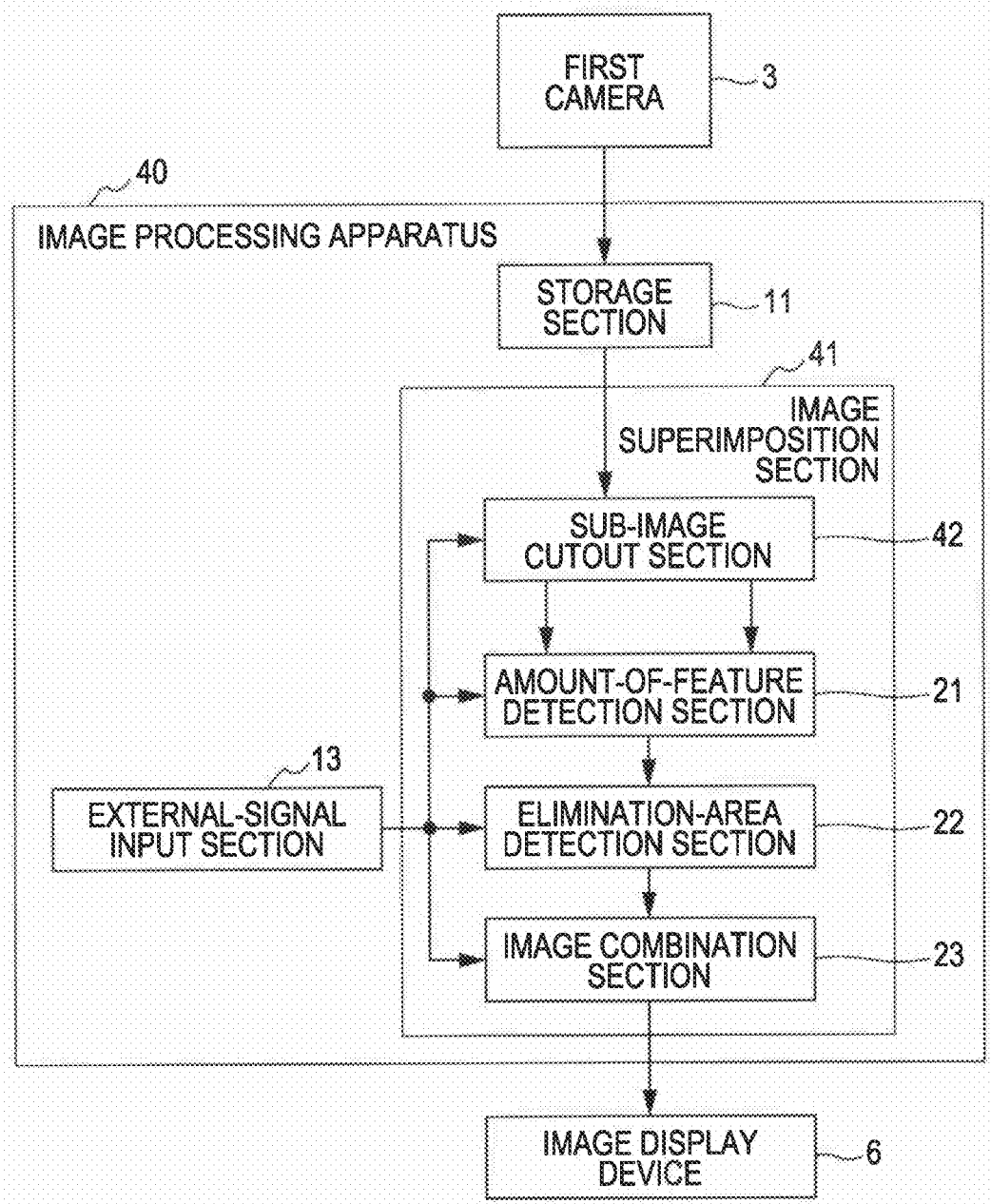

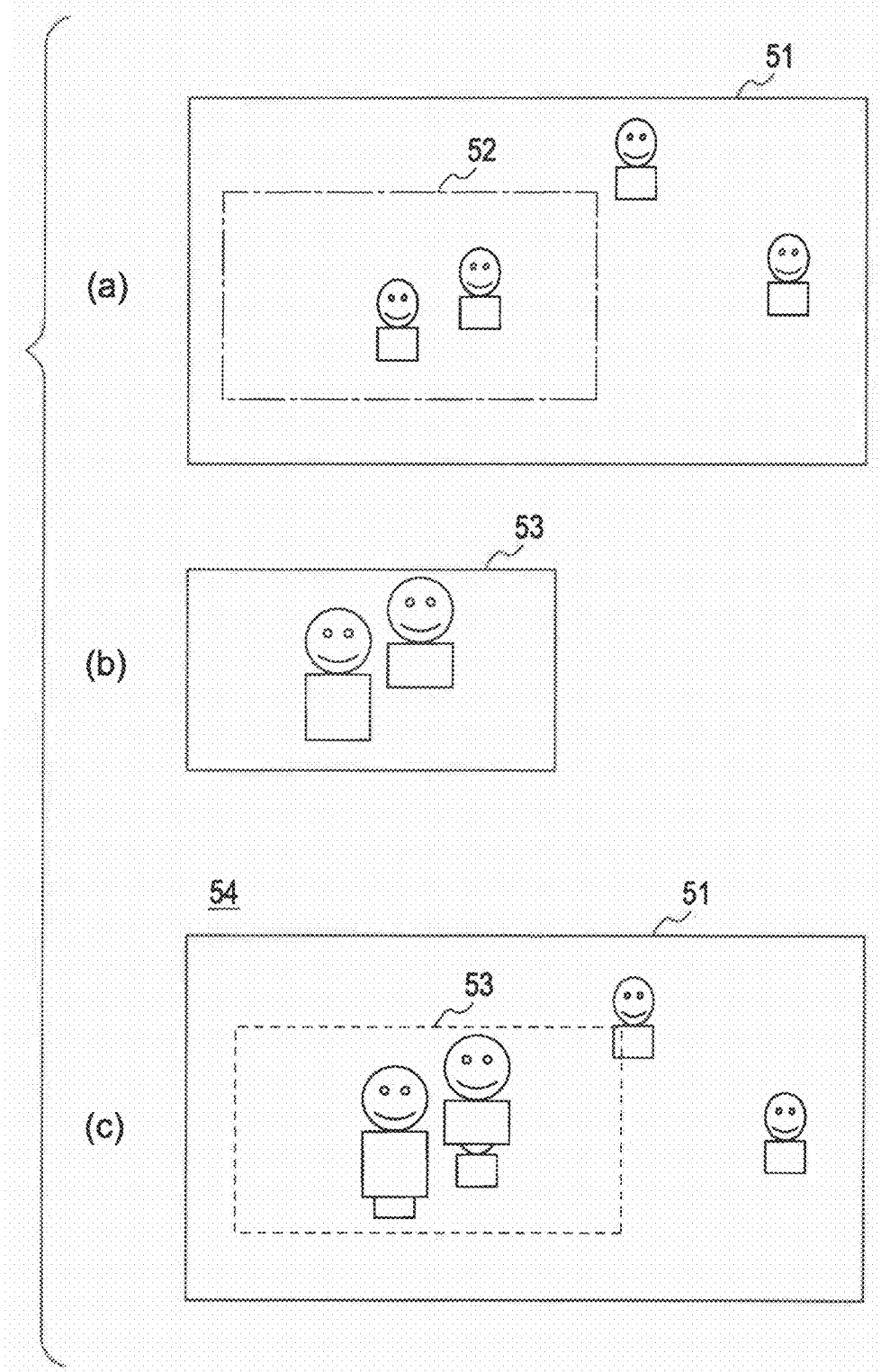

IMAGE FEATURE DETECTION APPARATUS, IMAGE FEATURE DETECTION METHOD, AND STORAGE MEDIUM

BACKGROUND OF THE INVENTION

1. Field of the Invention

The present invention relates to an image processing apparatus, a display control method, a program, and a storage medium which are preferably used for displaying multiple images on a single screen.

2. Description of the Related Art

In some cases, multiple images are combined and displayed on a single screen. Simultaneous display of multiple images typically employs, for example, a scheme for arranging reduced multiple images or a picture-in-picture (PinP) system for fitting different-angle sub images into part of a main image.

For generation of a composite image from multiple images, in general, common portions are determined, feature-point extraction and so on are performed, and the multiple images are combined together with the common portions being aligned with each other. For example, Japanese Unexamined Patent Application Publication No. 2005-182098 discloses a technology in which the amounts of features of multiple images are determined and are compared with each other to generate a composite image containing two or more superimposed images.

For example, Japanese Unexamined Patent Application Publication No. 10-164435 discloses a technology for enhancing an image quality by combining multiple images together in a spatiotemporal manner in order to allow for simultaneous understanding of the multiple images.

For example, Japanese Unexamined Patent Application Publication No. 2000-261794 discloses a technology for arranging and displaying, on one screen, multiple images captured by multiple cameras.

SUMMARY OF THE INVENTION

With the technology disclosed in Japanese Unexamined Patent Application Publication No. 2005-182098, it is difficult to completely match the images, because of a difference in angle or the like. Thus, with the composite image, it is difficult to simultaneously understand the multiple images.

In the technology disclosed in Japanese Unexamined Patent Application Publication No. 10-164435, no consideration is given to simultaneously viewing images captured by multiple cameras.

The technology disclosed in Japanese Unexamined Patent Application Publication No. 2000-261794 generally requires photographing the same portion from substantially the same direction. Thus, the image size may be reduced or the original image may be hidden by a superimposed image.

The present invention has been conceived in view of the foregoing situation, and it is desirable to allow multiple images to be simultaneously displayed on a single screen so that individual images can be easily viewed.

According to an embodiment of the present invention, an amount of features of a first image and an amount of features of a second image, the first image and the second image containing the same subject, are determined; an area in which the amount of features is larger than a predetermined threshold is eliminated from the second image to provide the second image in which the eliminated area is transparent; and the second image in which the eliminated area is transparent is superimposed on the first image.

With this arrangement, even for a composite image that is obtained by combining multiple images and that is displayed on a single image, it is possible to clearly show a difference between the images.

According to the present invention, a composite image obtained by superimposing a second image on a first image, the second image and the first image having the same object, can be supplied to an image display device for user viewing. The present invention, therefore, has an advantage in that the user can easily recognize a relationship between objects contained in the first and second images by simply viewing the composite image displayed on the single screen.

BRIEF DESCRIPTION OF THE DRAWINGS

FIG. 16 is a block diagram showing an example of the internal configuration of an image processing apparatus according to a second embodiment of the present invention; and FIG. 17 is a diagram illustrating an example of display of a superimposed image in the second embodiment of the present invention.

DESCRIPTION OF THE PREFERRED EMBODIMENTS

A first embodiment of the present invention will be described below with reference to FIGS. 1 to 15. In this embodiment of the present invention, a description will be given of an example in which images obtained from multiple cameras with different angles (photography points) and zooms (photography magnifications) are used by an image processing system 1 that is capable of displaying the images on one screen by using an image processing apparatus according to the embodiment of the present invention.

Figure 1:
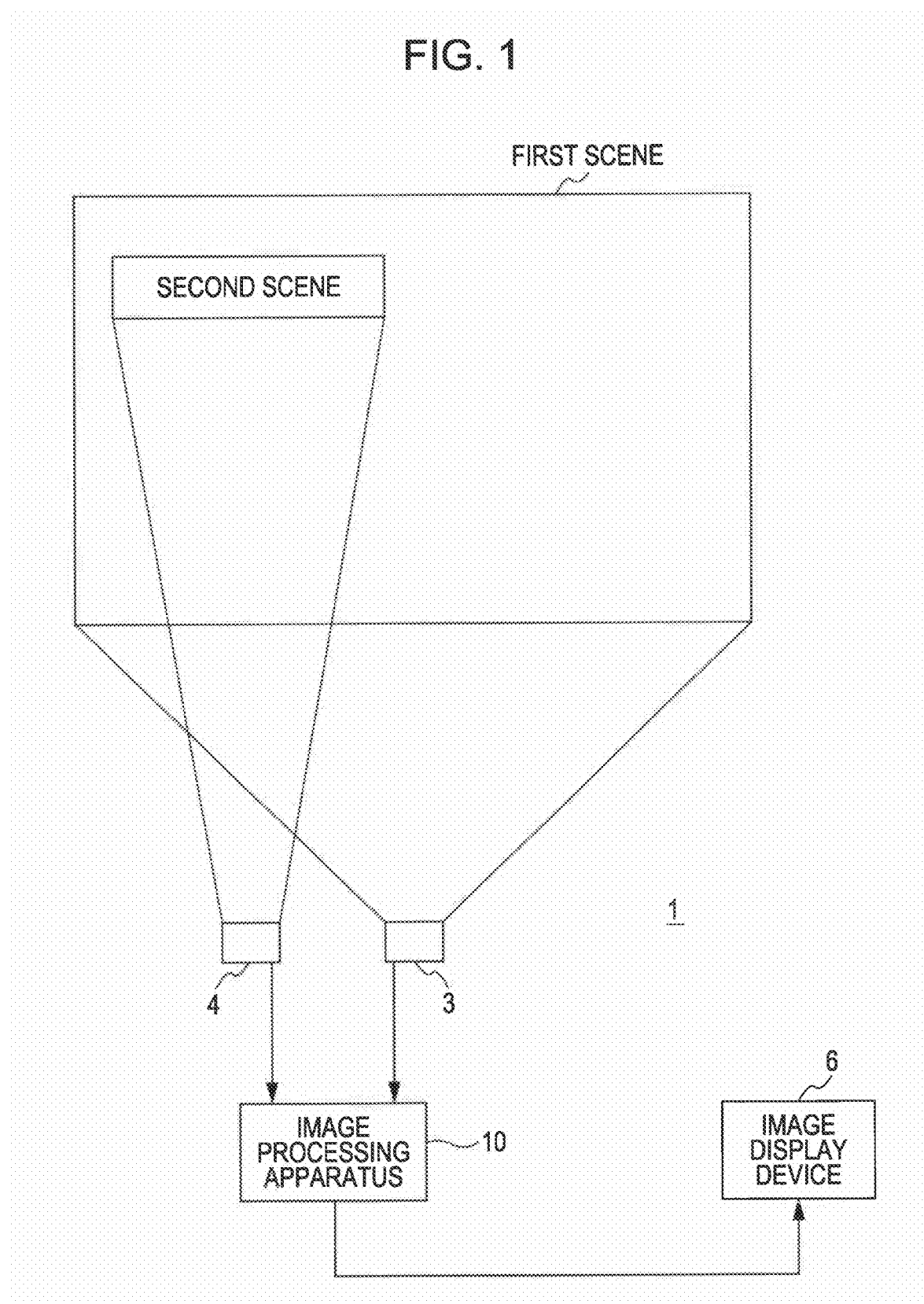
FIG. 1 is a diagram illustrating an example of the configuration of an image processing system according to a first embodiment of the present invention.

FIG. 1 shows an example of the configuration of the image processing system 1 according to the embodiment of the present invention.

The image processing system 1 includes a first camera 3, a second camera 4, an image processing apparatus 10, and an image display device 6. The first camera 3 captures an image of a first scene and generates a first image. The second camera 4 captures an image of a second scene in a smaller area than the first scene. On the basis of the first image input from the first camera 3 and the second image input from the second camera 4, the image processing apparatus 10 performs processing for combining images into a composite image. The image display device 6 displays the composite image combined by the image processing apparatus 10.

A subject of the first scene and a subject of the second scene are the same. In the present embodiment, however, the first camera 3 generates the first image through panning. On the other hand, the second camera generates the second image through zooming in. Thus, the first scene has a subject having a larger area than the second scene.

The image processing apparatus 10 superimposes one (which serves as a main image) of images, input from the first camera 3 and the second camera 4, on another image (which serves as a sub image) having an image size that is smaller than the main image, to generate a composite image.

The angles and the zooms of the first camera 3 and the second camera 4 are different from each other. The image display device 6 is, for example, a liquid crystal display device, an organic EL (electroluminescent) display device, or a projector device.

Figure 2:
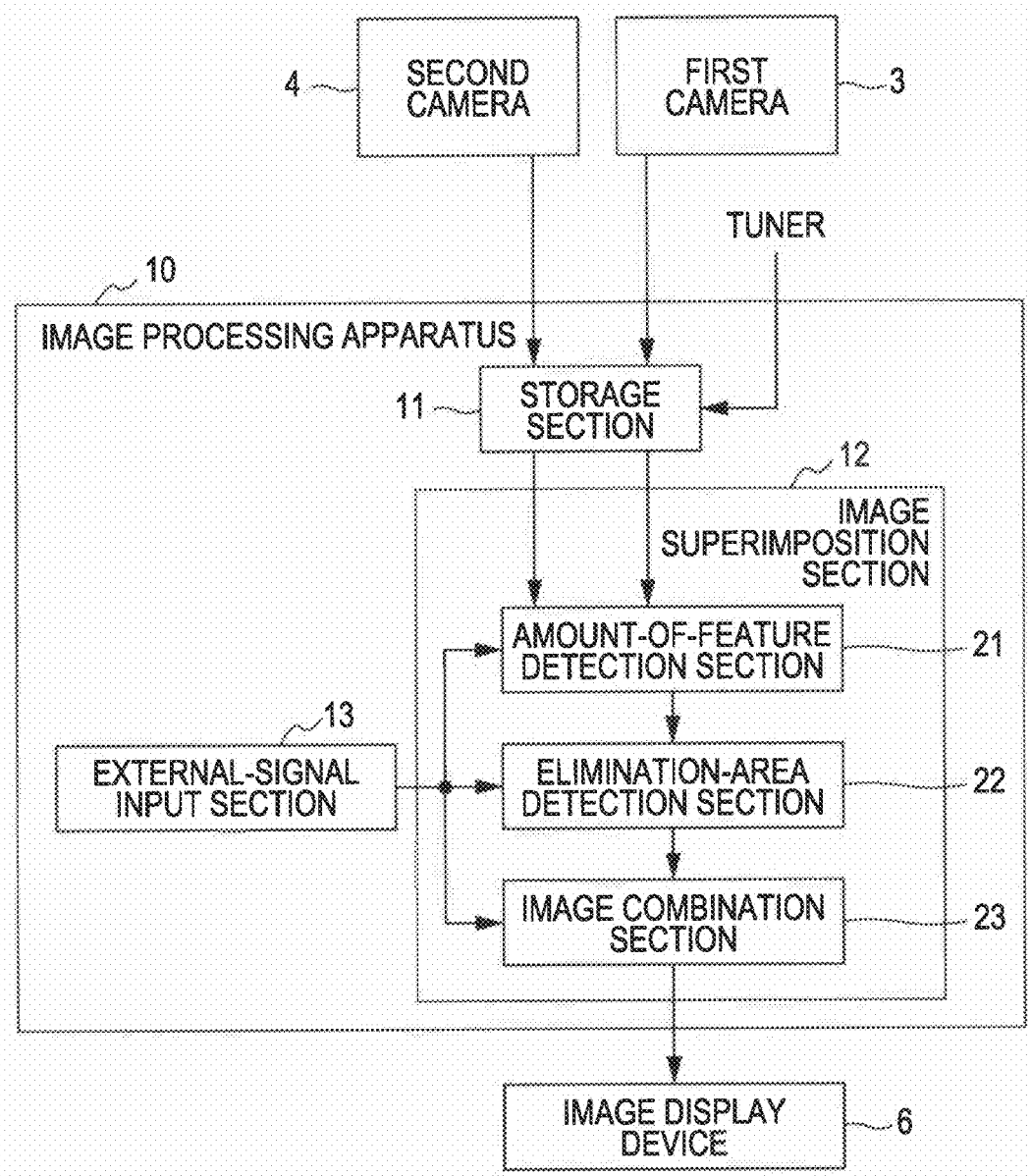
FIG. 2 is a block diagram showing an example of the internal configuration of an image processing apparatus according to the first embodiment of the present invention.

FIG. 2 shows an example of the internal structure of the image processing apparatus 10.

The image processing apparatus 10 includes a storage section 11, an image superimposition section 12, and an external-signal input section 13. The storage section 11 stores images input from the first camera 3, the second camera 4, and a tuner. The image superimposition section 12 performs predetermined processing on image signals read from the storage section 11. The external-signal input section 13 receives operation information and so on of an operation performed by a user.

The storage section 11 is, fore example, a large-capacity storage medium, such as a hard disk drive (HDD). Images stored in the storage section 11 are, for example, digital data compressed in an MPEG-2 (Moving Picture Experts Group 2) format, and include moving images and still images.

The image superimposition section 12 includes an amount-of-feature detection section 21, an elimination-area detection section 22, and an image combination section 23. The amount-of-feature detection section 21 detects amounts of features of subjects included in images. The amount-of-feature detection section 21 determines amounts of features contained in images having the same subject. The features determined by the amount-of-feature detection section 21 include color-gamut chromaticities contained in the first image and the second image and the amounts of motion (the scalar quantities of motion vectors) of subjects contained in the first image and the second image.

The elimination-area detection section 22 eliminates, from the second image, an area indicated by the amount of features that is greater than a predetermined threshold, and provides the second image in which the eliminated area is transparent. The image combination section 23 superimposes the second image in which the eliminated area is transparent on the first image to thereby provide a composite image. The composite image provided by the image superimposition section 12 is displayed by the image display device 6. The image superimposition section 12 may be implemented by, for example, a central processing unit (CPU).

The image processing apparatus 10 uses, for example, a YUV color model for a color space. In a YUV coordinate system for use in the YUV color model, a color is represented by a color space area determined by a brightness signal (Y), a signal (U) indicating a difference between the brightness signal and a blue signal, and a signal (V) indicating a difference between the brightness signal and a red signal. A distribution of colors used in images in the color space area is referred to as a "color gamut". Pixels included in the images input to the image processing apparatus 10 are represented by the YUV color model. In the present embodiment, a UV coordinate position determined for each pixel may also be referred to as a "color gamut".

The amount-of-feature detection section 21 detects, as amount of features, color gamuts contained in the first and second images. The amount-of-feature detection section 21 then determines a frequently detected color gamut that is common to the first image and the second image. In this case, a main image and a sub image are determined. The color gamut is determined for each of pixels included in the images. The color gamut can be represented by a three-dimensional chromaticity distribution diagram. When a large amount of the same color is contained in an image, color-gamut chromaticities corresponding to the color are accumulated. When the value of the accumulated chromaticities is greater than a predetermined threshold, a portion of the image, the portion containing the color gamut that appears most frequently, is extracted as a feature portion of the image (this portion of the image may also be referred to as a most-frequent color-gamut portion).

The amount-of-feature detection section 21 determines, for example, in which one of multiple input images a subject that the user wishes to see is contained.

A case in which three cameras (first to third cameras) are used to photograph a subject will now be described by way of example. In this case, the first camera and the second camera capture a panned image obtained by photographing an entire subject and a zoomed-in image of the subject contained in the panned image. In this case, the first camera and the third camera also photograph a panned image obtained by photographing an entire subject and a zoomed-in image of the subject contained in the panned image. In this case, the amount-of-feature detection section 21 checks, for example, whether or not any overlapping portion (subject) exists in the images captured by the second and third cameras. The amount-of-feature detection section 21 can determine the camera positions of the cameras as relationships among the cameras, and can detect the relationships as amounts of features.

The amount-of-feature detection section 21 identifies a color gamut that is common to both the first and second images, on the basis of the first and second images. The color gamuts determined by the amount-of-feature detection section 21 can be represented by accumulated color-gamut chromaticities contained in each image and represented by a YUV coordinate system. When the value of the accumulated chromaticities exceeds a predetermined threshold, the amount-of-feature detection section 21 detects, in the image, the color gamut as a color gamut in which the frequency of the chromaticity is the highest.

The amount-of-feature detection section 21 detects, as the amounts of features, the amounts of motion of the subjects contained in the first and second images, and determines a frequently detected amount of motion that is common to both the first and second images.

When the amount-of-feature detection section 21 detects the color gamuts of the first and second images as the amounts of features, the elimination-area detection section 22 eliminates an area corresponding to a color gamut that is common to the first and second images. In this case, the area corresponding to the color gamut that is common to the feature portion in the main image and the feature portion in the sub image is eliminated from a specified one of the images. Thus, for example, when images of ground are contained in both the main image and the sub image, the color gamut of the ground is detected as a color gamut that appears most frequently on the screen (this color gamut is also hereinafter referred to as a "most-frequent color gamut") and the ground image in which the most-frequent color gamut is contained is eliminated as a most-frequent color-gamut portion.

On the other hand, when the amount-of-feature detection section 21 detects the amount of motion of a subject as the amount of features, the elimination-area detection section 22 eliminates, from the second image, the background area of the subject object having the amount of motion.

The image combination section 23 superimposes the sub image, from which the image corresponding to the common color gamut is eliminated by the elimination-area detection section 22, on the main image to thereby provide a composite image. User operations are performed using an operation section (not shown), for example, a remote control device, buttons, a touch panel, and a pointing device. The operation section is connected to the external-signal input section 13. In accordance with an operation signal input from an external interface via the external-signal input section 13, the color gamuts determined by the amount-of-feature detection section 21, the predetermined thresholds, and the area eliminated by the elimination-area detection section 22 are determined. Similarly, the position of the sub image relative to the main image, the sub image being combined with the main image by the image combination section 23, is determined on the basis of an input sent from the operation section. As a result, the composite image displayed does not appear unnatural to a viewer.

Figure 3:
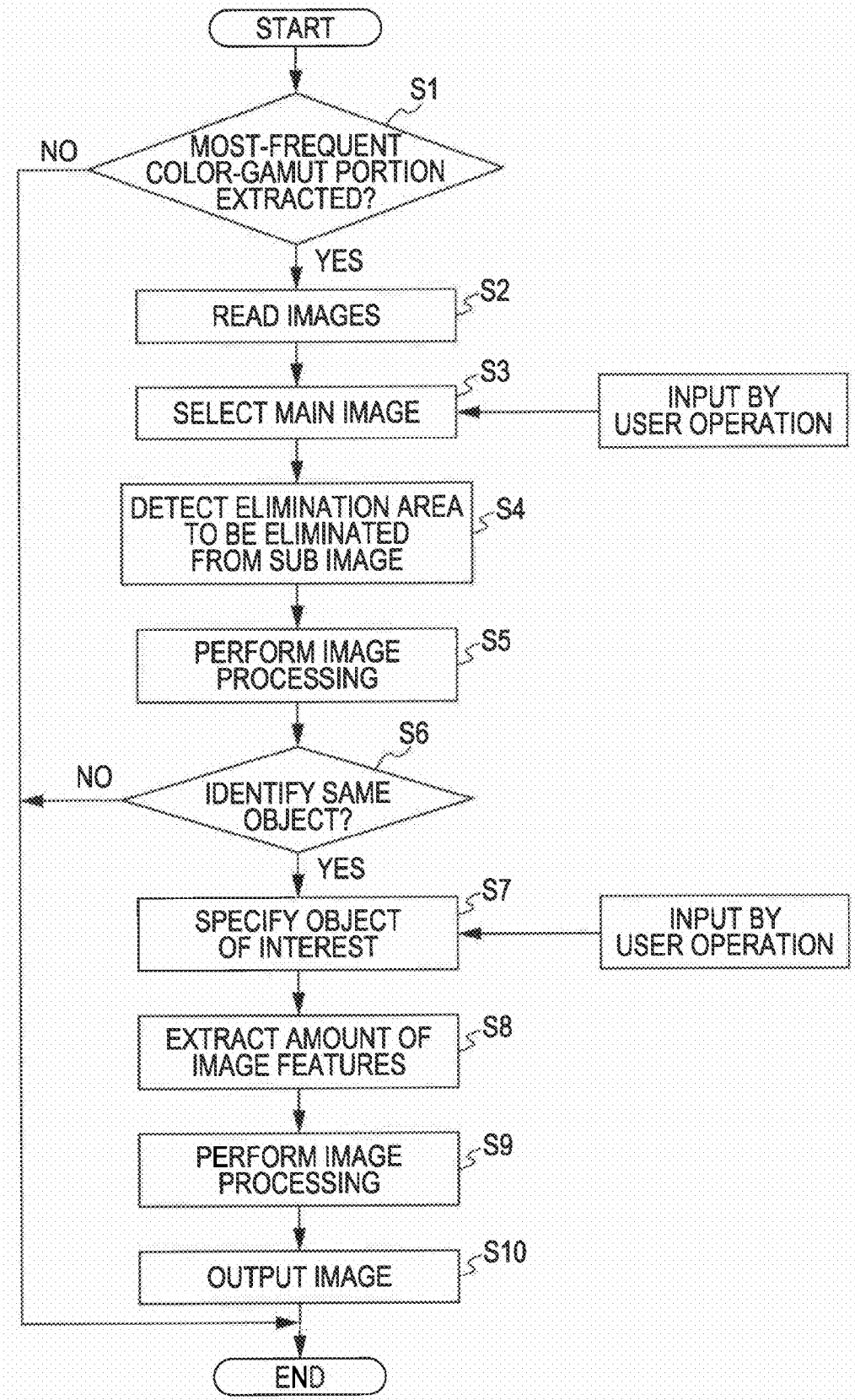
FIG. 3 is a flowchart showing an example of image superimposition processing according to the first embodiment of the present invention.

FIG. 3 is a flowchart showing an example of image superimposition processing that the image processing apparatus 10 according to the embodiment of the present invention performs to generate a composite image by superimposing a sub image on a main image.

Initially, the amount-of-feature detection section 21 determines whether or not to perform image superimposition processing. In step S1, the amount-of-feature detection section 21 determines whether or not to extract a most-frequent color-gamut portion from color gamuts of each image. This determination is pre-selected by, for example, a button operation performed by the user.

The selection processing is triggered by a command issued via the external-signal input section 13. On the basis of the received command, the amount-of-feature detection section 21 detects an amount of features of subjects (hereinafter may be referred to as "objects") contained in the images so as to facilitate subject selection. Thereafter, the amount-of-feature detection section 21 passes data of the detected amount of features. Subsequently, when the user has selected performing the image superimposition processing, processing in step S2 is performed.

When a most-frequent color-gamut portion is not to be extracted, the amount-of-feature detection section 21 finishes the image superimposition processing. The case in which a most-frequent color-gamut portion is not to be extracted corresponds to, for example, a case in which multiple images are displayed in a picture-in-picture state or in a juxtaposed state.

On the other hand, when a most-frequent color-gamut portion is to be extracted, in step S2, the amount-of-feature detection section 21 reads images stored in the storage section 11. In step S3, the amount-of-feature detection section 21 determines, of the read images, an image that serves as a main image, on the basis of information selected by the user and supplied from the external-signal input section 13.

The main image selected by the user may be either an image captured by the first camera 3 or an image captured by the second camera 4. In the main-image selection in step S3, an image captured by the first camera 3 may be predetermined as the main image. The arrangement may also be such that multiple sub images are displayed as thumbnails on part of the main image to allow the user to select a desired one of the sub images from the thumbnails.

Next, in step S4, the elimination-area detection section 22 detects an elimination area to be eliminated from the sub image. The elimination area is determined on the basis of, for example, most-frequent color gamuts in multiple images. In step S5, the elimination-area detection section 22 eliminates the detected elimination area from the sub image.

The description in the present embodiment is given of processing in which a most-frequent color gamut is detected, a color gamut that is common to the images to be combined is determined as a parameter for elimination from the sub image, and then the color gamut is eliminated from the image. Other settable parameters, however, are also available. For example, an area containing an object having a largest scalar quantity in the motion vector may be determined as a "most-frequent amount-of-motion area", or conversely, a portion having a lowest scalar quantity in the motion vector may also be determined as the elimination area. The parameters determined from those motion vectors may also be used in combination when the color gamut is used as a parameter, or may be used when the color gamut is not used as a parameter. The processing for detecting the elimination area may be performed using the frequencies of object motion between frames. Possible examples of an indicator representing the motion frequency include the size of a subject, a direction, and a differential value.

Next, in step S6, the image combination section 23 determines whether or not to identify an identical object in the main image and the sub image. The term "object" as used herein refers to a target to which the user desires to particularly pay attention and is, for example, a person (people) or a ball in an image. An object that is common to the main image and the sub image is referred to as an "identical object". When an identical object is identified, the coordinates of the objects in the main image and the sub image, the coordinates being used for superimposing the images, are determined.

In the processing in step S6, the image combination section 23 determines whether or not to superimpose the sub image on the main image with the identical objects being aligned with each other. When no identical object is identified, the image combination section 23 merely superimposes the sub image on any of four corners of the screen of the main image and finishes the image superimposition processing.

On the other hand, when the image combination section 23 superimposes the sub image on the main image with the identical objects being aligned with each other, in step S7, the image combination section 23 identifies an object of interest on the basis of user selection information supplied from the external-signal input section 13.

The object of interest is one type of parameter and represents, for example, a person, a ball, a uniform number, or the like in the image. When the user particularly wishes to know details of the motion of the object and the state of the surroundings, identification of the object of interest makes it possible to display those details on the sub image.

Next, in step S8, the image combination section 23 extracts an amount of image features to keep track of the object. The image combination section 23 performs tracking for specifying the superimposition position of the object specified as the amount of features and determines a motion vector and so on. The tracking may be performed through designation using the remote control device (not shown) operated by the user or through automatic tracking performed by the image processing apparatus 10. An operation signal output from the remote control device is supplied to the image combination section 23 via the external-signal input section 13.

The image features extracted in step S8 are detected for each frame with respect to the object of interest determined by the amount-of-feature detection section 21. For example, when multiple images are to be superimposed and the identical object is assumed to be a ball, the amount-of-feature detection section 21 performs processing for detecting the motion of the ball. One example of the processing for detecting the motion of the ball is processing for determining a motion vector detected from each image (or processing for determining an optical flow).

In step S9, on the basis of the amounts of features determined from the multiple images, the image combination section 23 detects an identical object and performs image processing for generating a composite image by superimposing the sub image on the main image. Similarly, the position of the sub image relative to the main image, the sub image being combined with the main image by the image combination section 23, may be determined on the basis of the motion of the object contained in the main image. Lastly, in step S10, the image combination section 23 outputs the composite image to the image display device 6.

The designation of the object of interest in step S7 may be set so that it is automatically performed by the image combination section 23. For example, for the user input, the operation section may have an automatic designation button, an automatic learning designation button, or the like.

The automatic designation button is a button for giving an instruction for disabling a user operation input and causing the image processing apparatus 10 to automatically determining an object of interest. When the automatic designation button is pressed, any object of interest specified by the user is not selected in the processing in step S7. An identical object to be superimposed can be determined using the amount of features determined in step S8. In this case, an object (an area) having a largest motion vector is determined as the object of interest.

The automatic learning designation button refers to a button for giving an instruction for causing the image processing apparatus 10 to automatically determine an object of interest by using past results of determined objects of interest. The past objects of interest are determined from a user operation log. For example, when the operation log shows that the user paid attention to a small amount of motion of an object located at a lower portion on the screen, the object can be automatically determined as an object of interest. For example, when the operation log shows that the user performed image superimposition while paying attention to a batter during display of the area of the battery (a pitcher and a catcher) in a baseball game broadcast, an object of interest (e.g., a batter) is determined on the basis of the amount of features (e.g., the motion vector of the base-ball batter) automatically determined from the operation log.

Figure 4:
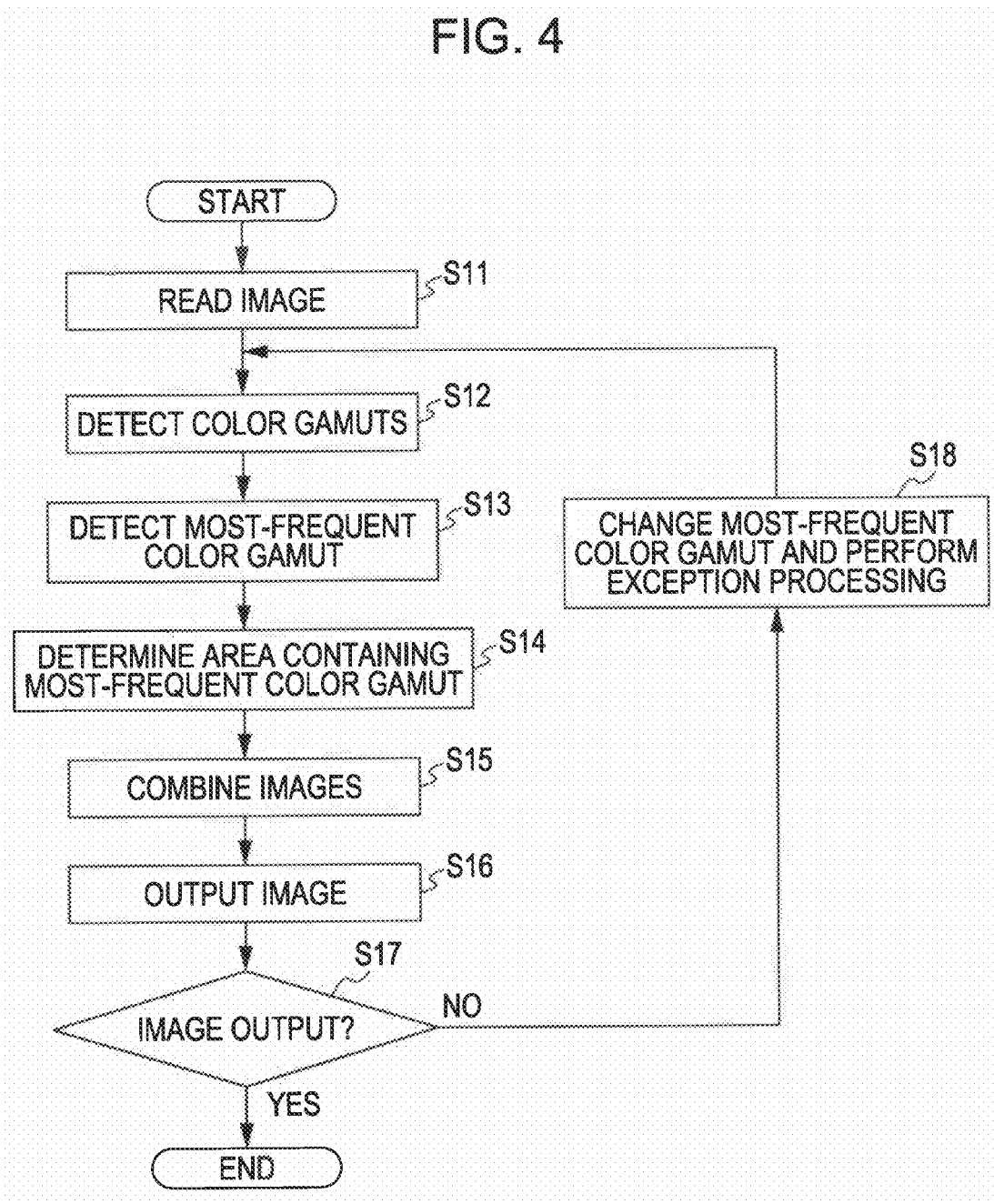
FIG. 4 is a flowchart showing an example of image color-gamut detection processing and image combination processing according to the first embodiment of the present invention.

FIG. 4 is a flowchart showing an example of color-gamut detection and image combination processing. Processing in steps S4 and S5 in the image superimposition processing (FIG. 3) will now be described in detail.

First, in step S11, the amount-of-feature detection section 21 reads an image that serves as a main image determined in step S3 in the image superimposition processing (FIG. 3). In step S12, the amount-of-feature detection section 21 detects color gamuts for respective pixels of the read images.

In step S13, the amount-of-feature detection section 21 detects, from each of the read images, a most-frequent color gamut to be eliminated. In step S14, the amount-of-feature detection section 21 determines an area containing the most-frequent color gamut to be eliminated from a second image. The processing in steps S12 to S14 corresponds to the processing in step S4 in the image superimposition processing (FIG. 3).

In step S15, the image combination section 23 combines the first image and the second image into a superimposed composite image. In step S16, the image combination section 23 outputs the superimposed composite image to the image display device 6. In step S17, a determination is made as to whether or not the superimposed composite image is to be output to the image display device 6. In this case, modifications, such as changing an area of a color gamut to be eliminated and performing exception processing, are executed through a user operation or using the operation log or the like. The processing in steps S15 to S17 corresponds to the processing in step S5 in the image superimposition processing (FIG. 3).

The exception processing refers to processing for also eliminating, from the sub image, an area that is not determined as an area having a most-frequent color gamut. An area to be eliminated in the exception processing is an area to enhance, when it is eliminated, the user visibility. For example, there are cases in which, in an image in which a baseball game is displayed, a color gamut corresponding to the mound does not lie within the most-frequent color gamut. The user, however, often does not pay highest attention to the area in which the mound is displayed. In this case, when the user specifies the mound by using the operation section (e.g., the pointing device), the image combination section 23 can eliminate the color gamut of an area that lies around the specified portion and that contains the same color gamut. Conversely, there are cases in which the user pays attention to only a certain color gamut and wishes to leave a particular portion in the composite image. In such a case, even when the color gamut is within the most-frequent color gamut, the image can be superimposed without elimination of a color gamut contained in the portion that the user does not wish to eliminate. In addition, even when the color gamut is within the most frequency color gamut, a specific area or a portion showing a specific motion may be left.

When the output image is not a desired image, the value of the most-frequent chromaticity is changed and the color gamut is re-determined in step S18. The processing then returns to step S12. When the output image is a desired image, the image is output to the image display device 6 and the image combination processing is finished.

FIGS. 5 to 15 show examples of images to be superimposed and color gamuts of the images.

Figure 5:
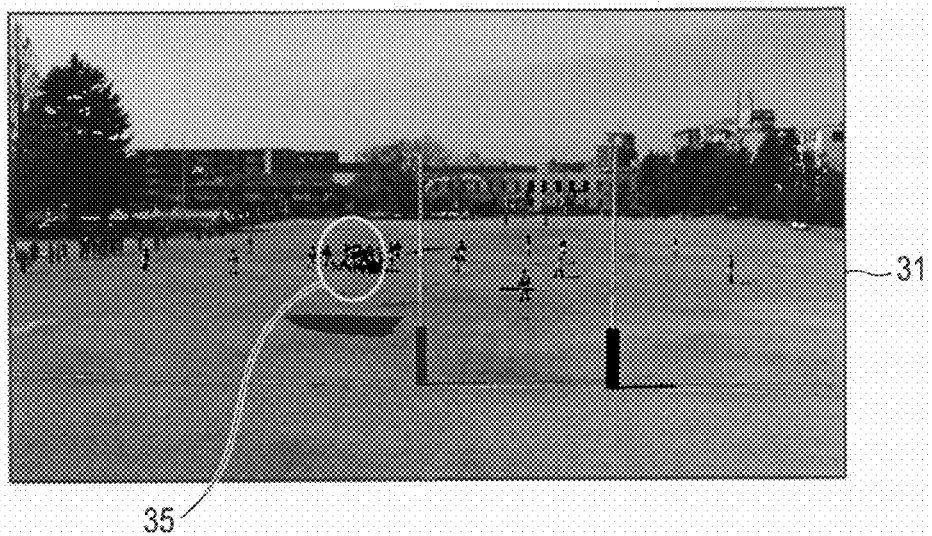
FIG. 5 illustrates an example of a first image in the first embodiment of the present invention.

FIG. 5 shows an example of a first image 31 captured by the first camera 3.

Figure 6:
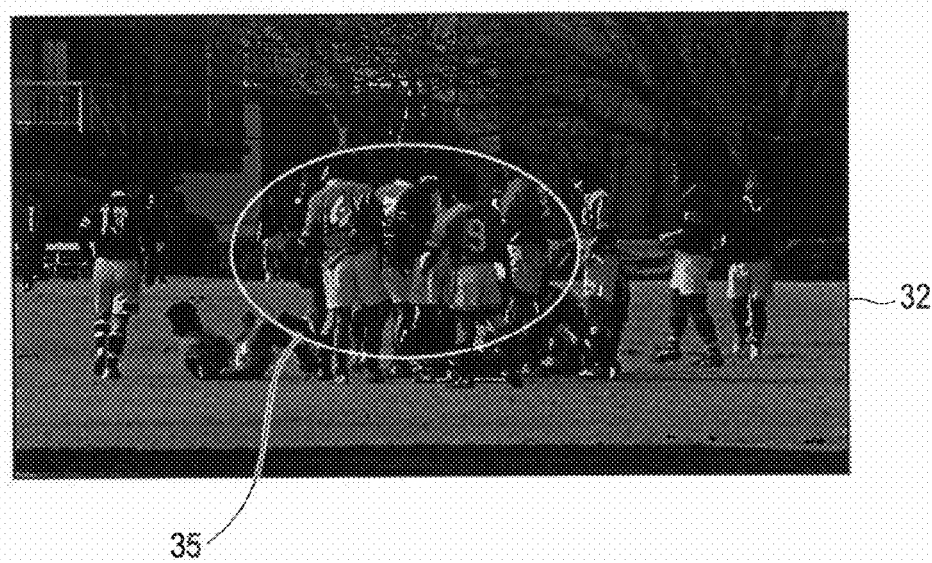
FIG. 6 illustrates an example of a second image in the first embodiment of the present invention.

FIG. 6 shows an example of a second image 32 captured by the second camera 4.

Images obtained by photographing the same scene are input to the image processing apparatus 1. In this example, the first image 31 is a panned image of a subject 35 (a ruck in rugby). The second image 32 is a zoomed-in image of the subject 35 contained in the first image 31. Examples of a set of different-angular images input from the storage section 11 include a set of an original image and an image obtained by zooming in only a portion of the image and a set of multiple images captured from different angles and subjected to image processing. However, these images contain an identical subject.

When it is determined that the image superimposition processing is to be performed, images are read and the user selects an image that serves as a main image from the read images. In this case, it is assumed that the first image 31 is selected as the main image.

Figure 7:
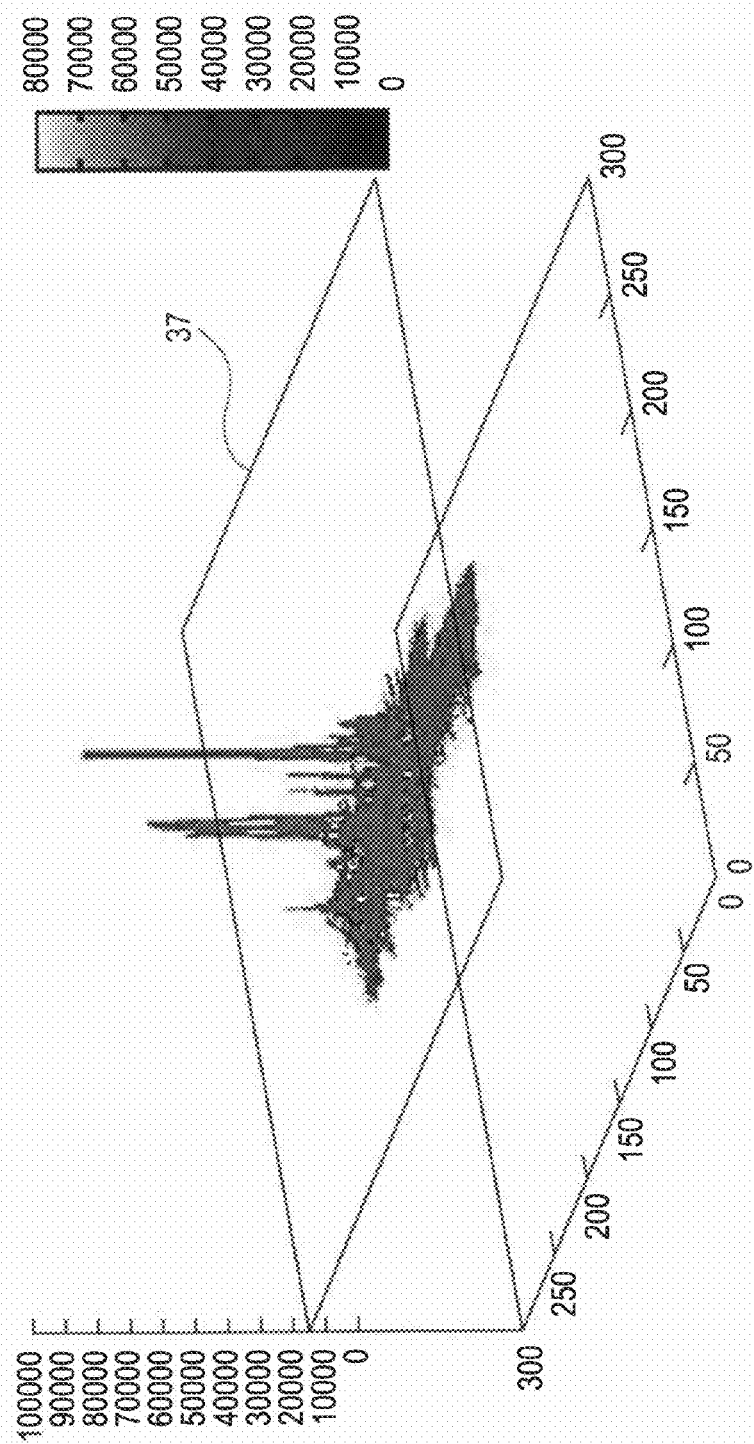
FIG. 7 illustrates an example of an example of a color-gamut distribution of the first image in the first embodiment of the present invention.

FIG. 7 is a diagram showing an example of a color gamut distribution of the first image 31.

Figure 8:
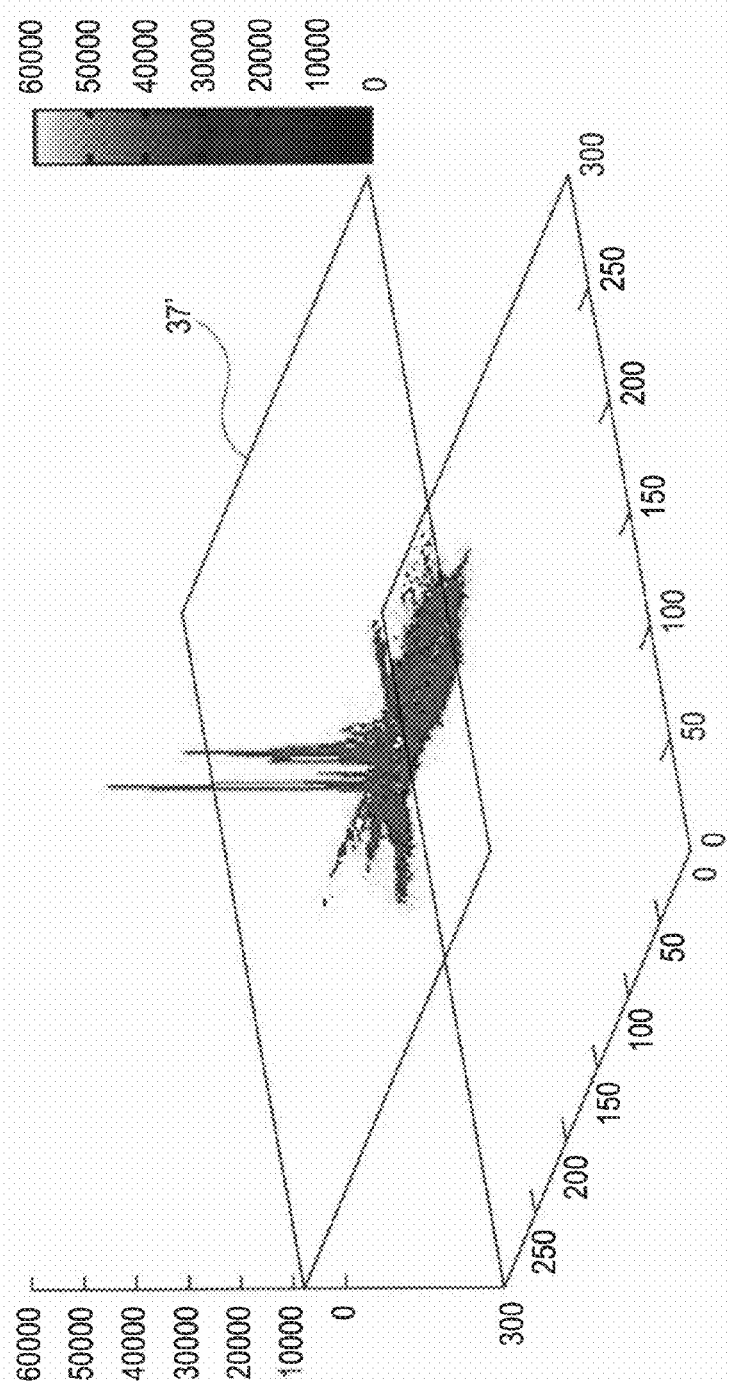
FIG. 8 illustrates an example of an example of a color-gamut distribution of the second image in the first embodiment of the present invention.

FIG. 8 is a diagram showing an example of a color gamut distribution of the second image 32.

In the following description, each color gamut distribution diagram indicates u and v in the YUV coordinate system and color-gamut chromaticities. Typically, when the number of pixels of cameras used to capture an image varies, the range of chromaticities in the color gamut distribution diagram also varies. Thus, in order to determine the color gamuts of common portions, normalization is performed to match the chromaticities. The term "normalization" refers to processing for matching the maximum values of chromaticities of two images.

FIGS. 7 and 8 show thresholds 37 and 37' for determining most-frequent color gamuts, respectively. Color gamuts that exceed the thresholds 37 and 37' can be said as colors that are contained in the large amounts in the respective images. The amount-of-feature detection section 21 first determines a color gamut distribution of the entire screen of each input image. The amount-of-feature detection section 21 then normalizes the distribution of each color gamut and detects areas having common color gamuts from input image signals. In this case, parameters of the first camera 3 and the second camera 4 are corrected so as to match the most-frequent color gamut of one of the images with the most-frequent color gamut of the other image. In this case, a color-gamut conversion table may be used. Thereafter, a color gamut to be eliminated is determined in the image to be superimposed. However, an area in which the detected color gamut is contained and an area in which the color gamut is to be eliminated is contained do not necessarily match each other on a one-to-one basis.

Figure 9:
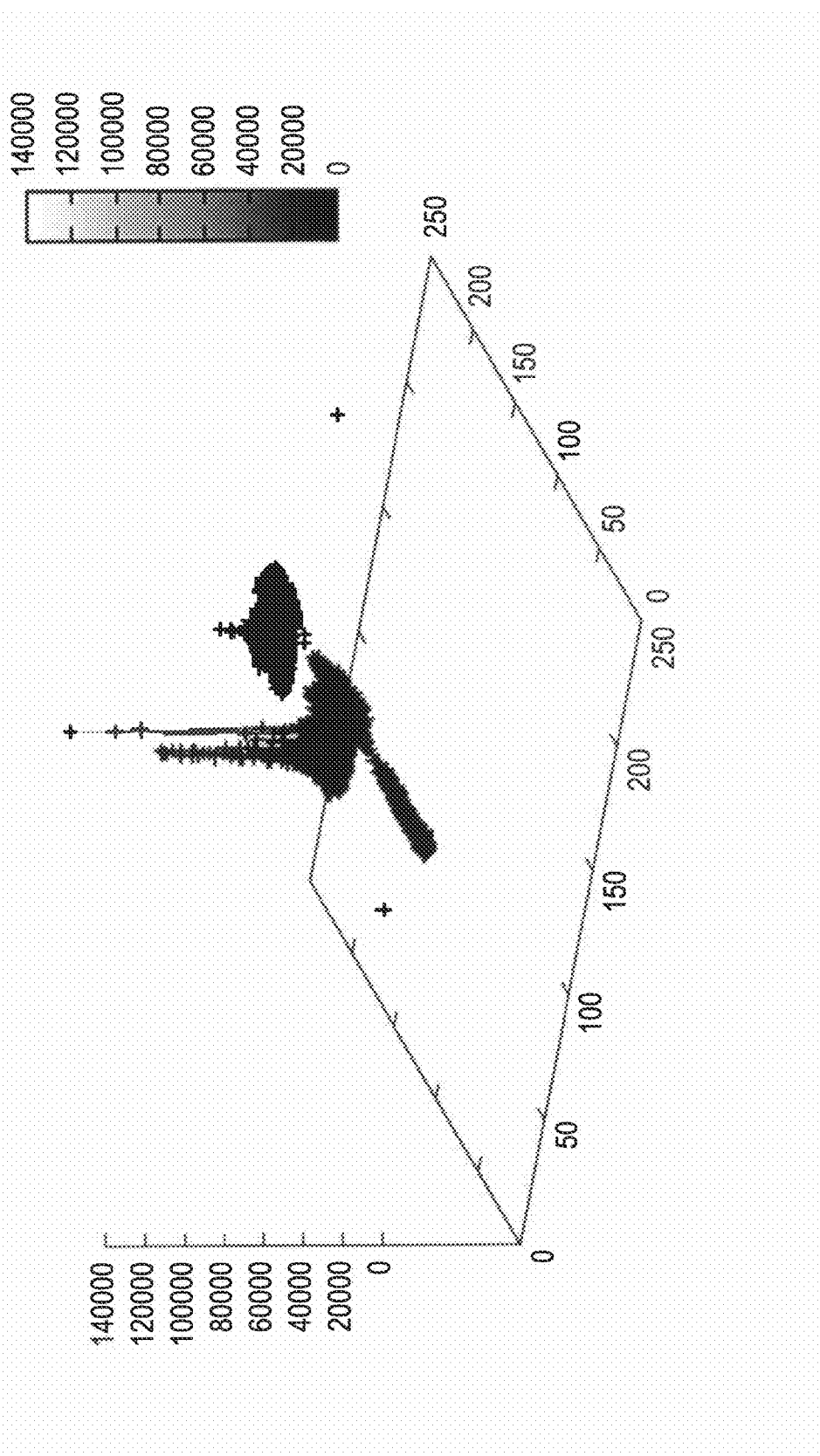
FIG. 9 illustrates an example of a color gamut of the first image in the first embodiment of the present invention, the color gamut exceeding a threshold.

FIG. 9 shows an example of a color gamut distribution of the first image 31, the color gamut exceeding the threshold 37.

Figure 10:
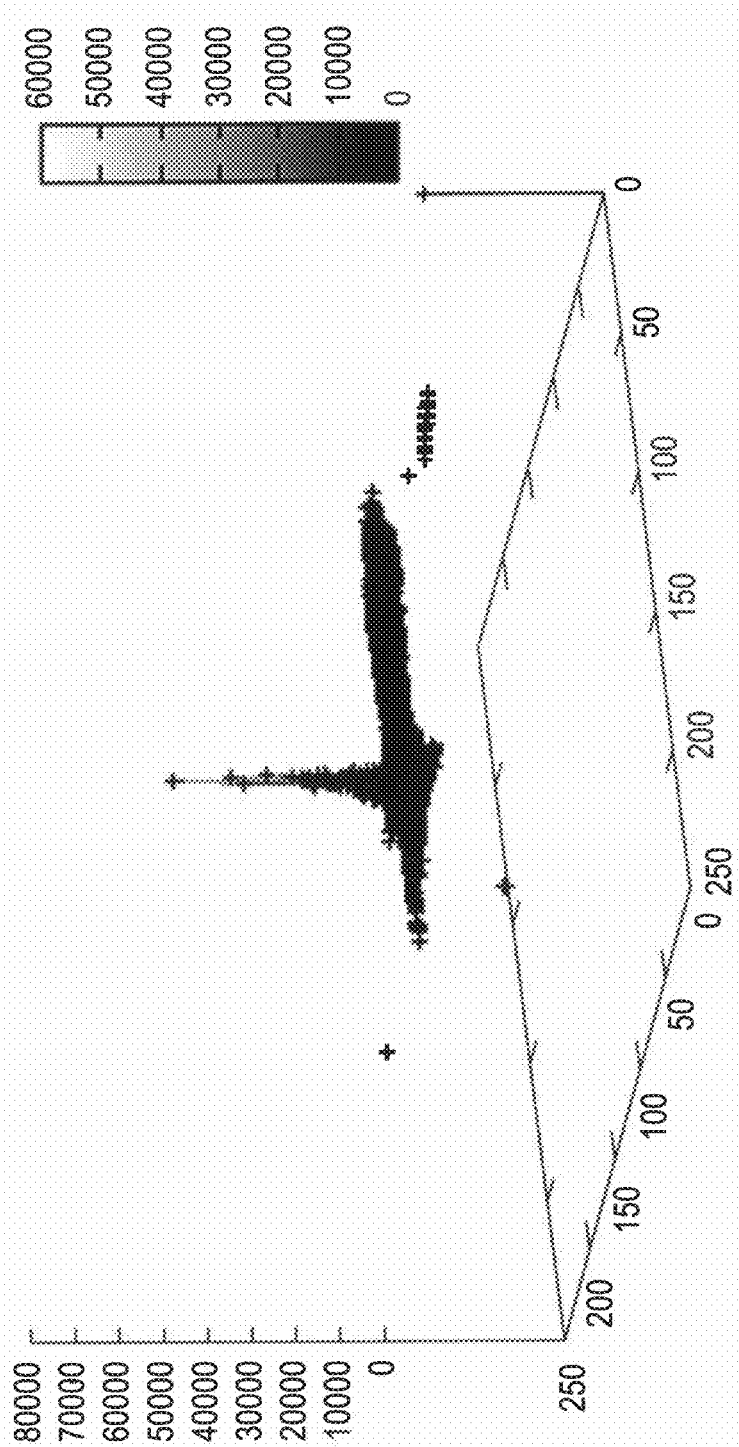
FIG. 10 illustrates an example of a color gamut of the second image in the first embodiment of the present invention, the color gamut exceeding a threshold.

FIG. 10 shows an example of a color gamut distribution of the second image 32, the color gamut exceeding the threshold 37'.

More specifically, FIGS. 9 and 10 show, in the color gamut distributions shown in FIGS. 7 and 8, color gamuts that exceed the predetermined thresholds. The thresholds can be arbitrary changed by the user. A color gamut that exceeds the predetermined threshold can be said as a color that is mostly frequently displayed in each image. A color gamut that is common to the first image 31 and the second image 32 can be determined as follows.

Figure 11:
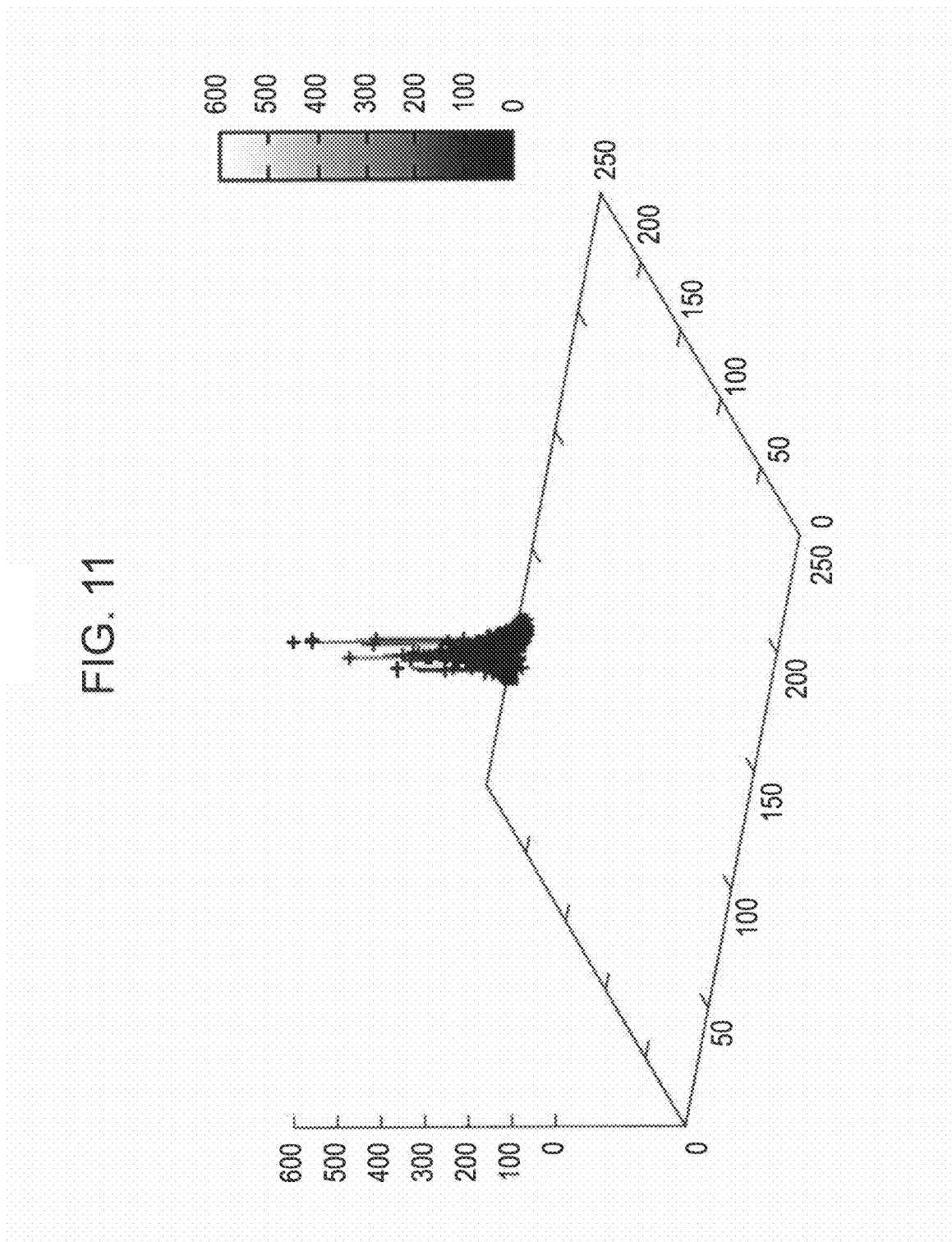
FIG. 11 illustrates an example in which, of the color-gamut distributions of the first and second images in the first embodiment of the present invention, the color gamut of a common portion which exceeds the threshold is expressed in a three-dimensional space.

FIG. 11 shows an example of a color gamut of the common portion of the first image 31 and the second image 32, the color gamut exceeding the thresholds.

Figure 12:
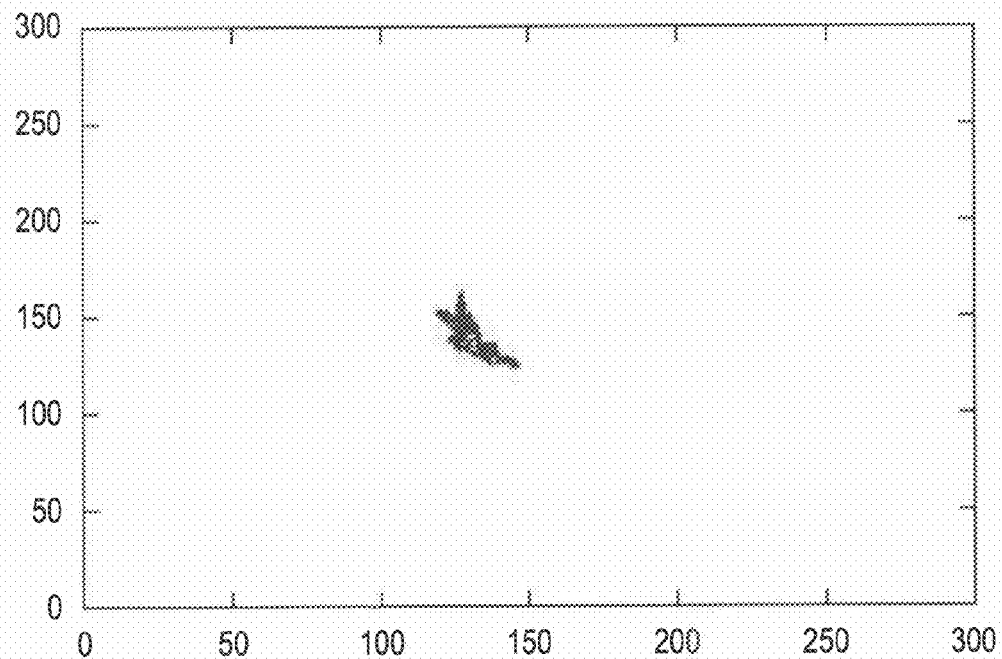
FIG. 12 illustrates an example in which, of the color-gamut distributions of the first and second images in the first embodiment of the present invention, the color gamut of a common portion that exceeds the threshold is expressed in a two-dimensional space.

FIG. 12 shows, in a two dimensional space, the color gamut of the common portion of the first image 31 and the second image 32.

In the first image 31 and the second image 32, a color having the largest amount is the color (e.g., brown) of the ground. Thus, color gamut distributions that exceed the predetermined thresholds are extracted from the color gamut distributions shown in FIGS. 7 and 8, so that a common color gamut is determined. With respect to the determined color gamut, color of a corresponding portion is eliminated from the color shown in FIG. 8 as a common portion.

Figure 13:
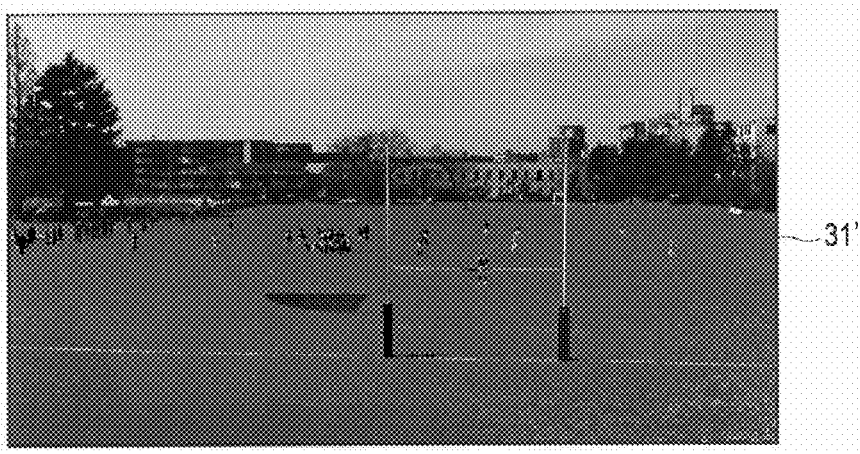
FIG. 13 illustrates an example of an image obtained by eliminating a predetermined color gamut (the color of ground) from the second image in the first embodiment of the present invention.

FIG. 13 is an example of a first image 31' obtained by performing image processing on the first image 31.

The image 31' show in FIG. 13 is an image obtained by extracting the most-frequent color-gamut portion that is determined to be redundant on the basis of two images (the first image 31 and the second image 32). The common portion can be extracted by using a method for extracting a background from multiple images.

When the main image (the second image 32) is determined, a most-frequent color gamut to be extracted as a redundant common portion that is common to the main image and the sub image (the first image 31) is determined. The most-frequent color gamut in the first image 31 corresponds to the color of the ground that occupies almost half of the screen. Similarly, the most-frequent color gamut in the second image 32 corresponds to the color of the ground that occupies almost half of the screen. Thus, when the most-frequent color gamut is eliminated from the first image 31, the first image 31' is generated. In the image shown in FIG. 13, the most-frequent color gamut in the second image 32 corresponds to the color of the ground that occupies almost half of the screen. The most-frequent color gamut in the first image 31 also corresponds to the color of the ground that occupies almost half of the screen. Thus, the ground color that is common to the first image 31 and the second image 32 is eliminated from the second image 32 to generate a second image 32'.

Depending on a scene, the motion of each camera is cancelled in order to determine the most-frequent color-gamut portion. In this case, the most-frequent value of the motion vector is used as a common portion of the images. This processing is performed, for example, when the camera is panned or tilted or moved in a zoom direction to perform photography. That is, when the motion vector of an object is to be detected as an amount of features and the camera is panned, tilted, or zoomed, the motion thereof appears in the motion vectors in the image. For example, when panning is performed from left to right, the subject shifts in the opposite direction (i.e., from right to left). Also, during zoom-in, objects other than an object located at the center of the image shift out of the screen.

In order to improve the accuracy of matching, it is highly desirable to eliminate an influence of motion vectors resulting from motion of the camera. For example, for an image captured through panning of the first camera, a motion vector resulting from the panning (the motion vector is opposite to the panning direction) is eliminated. This processing facilitates that the motion vector of the subject photographed by the second camera, which performs a photography operation (motion) that is different from the first camera, is made to match the motion vector of the subject photographed by the first camera. This processing may also be referred to as "cancelling the camera motion". The processing for cancelling the camera motion does not have to be performed during determination of color contained in the image. On the other hand, when a most-frequent motion vector is detected to identify an object, the processing for cancelling the camera motion is performed.

The processing performed by the amount-of-feature detection section 21 is performed in step S8 in FIG. 3 as processing for matching motion vectors during determination of a basically identical object. This processing is also performed in step S4 in FIG. 3, when a parameter for determining the identical object having a most-frequent motion vector, rather than the most-frequent color gamut, is used. In this case, the most-frequent value of the motion vectors is used for determination for identifying a subject and for identifying an elimination area. Even in this case, the most-frequent motion vector is used to determine a common potion of multiple images.

Figure 14:
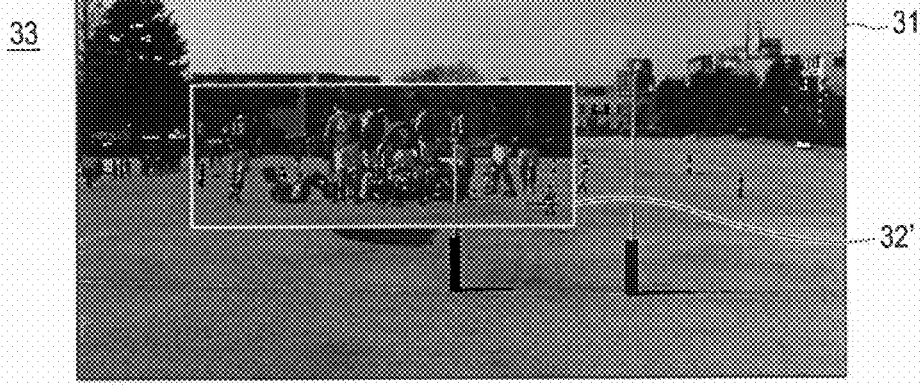
FIG. 14 illustrates an example of an image obtained by combining the second image with the first image, the first image being a main image, in the first embodiment of the present invention.

FIG. 14 shows an example of a composite image 33 obtained by combining the first image 31, as the main image, and the image-processed second image 32', as a sub image. Although the border of the second image 32' in FIG. 14 is shown as a frame, this frame is shown for convenience of description and thus does not necessarily have to be present in the image. Needless to say, a frame may be displayed so as to make it easy to understand that the sub image is superimposed on the main image.

A portion (e.g., ground) that is common to the multiple images is extracted and then the resulting images are combined with each other. Image superimposition coordinates used when the images are superimposed on the same screen for output are determined, and the user specifies an identical object. The image superimposition coordinates refer to the coordinates of an identical object in the composite image. The image coordinates generally refer to the coordinates of the center (barycenter) of an object. Alternatively, an arbitrary feature point of an object may be used as position-alignment coordinates. Detecting the coordinates of an identical object contained in the main image and the sub image makes it possible to determine a difference relative to the image superimposition coordinates. When the object in the main image and the object in the sub image are shifted so as to eliminate the difference and the main image and the sub image are combined with each other, a composite image is rendered with an identical object (e.g., a ball) being constantly displayed at the image superimposition coordinates.

In order to determine the image superimposition coordinates, the identical objects in both images are made to match each other. The identical-object matching refers to processing for detecting an identical object from amounts of features (e.g., color and shape) of objects that are contained in multiple images. In addition, matching motion vectors can also makes it possible to determine an identical object. When an identical object contained in multiple images is detected, it is possible to perform processing so that the identical object is shown at the same coordinates on the displayed screen.

In this case, for example, the image processing apparatus 10 displays, on the image display device 6, a selection menu for identifying an object. The selection menu serves as a menu for selecting between a user operation and an automatic operation. When the user operation menu is selected, the user specifies, in the main image, a target point (i.e., an object of interest) that he or she wishes to enlarge. When the automatic operation menu is selected, the image processing apparatus 10 specifies, as an object of interest, an object having a large amount of motion through automatic detection.

After the object of interest is specified, the sub image is superimposed on the main image. After objects of interest are specified in the main image and the subject image in one frame, the motions of the objects are tracked.

Figure 15:
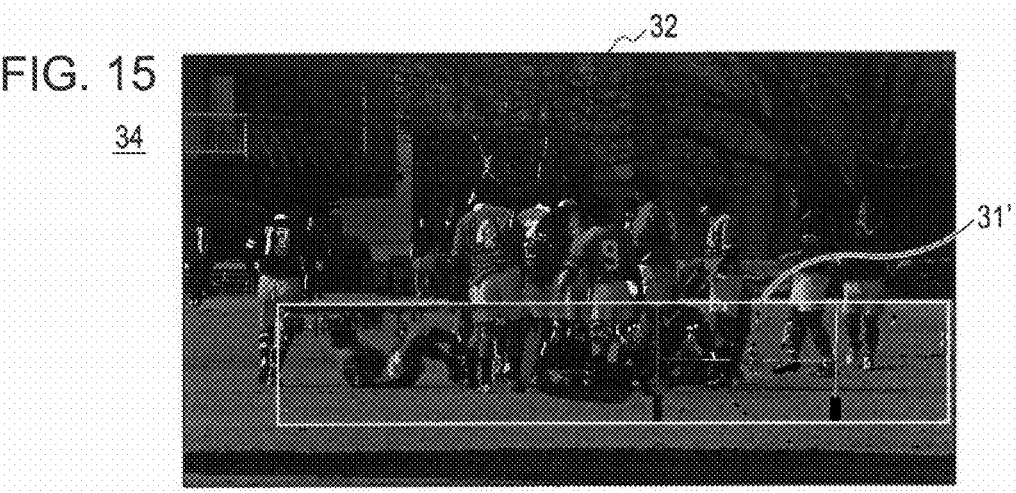
FIG. 15 illustrates an example of an image obtained by combining the first image with the second image, the second image being a main image, in the first embodiment of the present invention.

FIG. 15 shows an example of a composite image 34 obtained by combining the second image 32, as the main image, and the image-processed first image 31', as a sub image. Although the border of the first image 31' in FIG. 15 is shown as a frame, this frame is shown for convenience of description and thus does not necessarily have to be present in the image. Needless to say, a frame may be displayed so as to make it easy to understand that the sub image is superimposed on the main image.

In this case, the first image 31' subjected to image processing is superimposed on the second image 32. The image processing performed on the first image 31' is analogous to the processing described above with reference to FIG. 13. However, the first image 31' that serves as the sub image is superimposed with a varied zoom ratio. In such a manner, the magnification and the shape of the composite image can be changed by user operation. With this arrangement, for example, for a moving image, each motion of a person becomes clear. Thus, the user can see a superimposed image without feeling unnatural. Additionally, multiple images can be superimposed after a common portion (the color gamut of the ground, in this example) is eliminated. As a result, when the user views the image, the motion of the viewpoint is reduced.

When an identical object is determined and the second image 32 from which the background of the subject is eliminated is to be superimposed on the first image 31, the amount of motion and the color gamuts may be determined as a first amount of features and second amounts of features, respectively, and be used in combination. The amount-of-feature detection section 21 can detect, as the first amount of features, the amount of motion of the subject contained in the first and second images. The first amount of features represents a frequently detected amount of motion that is common to the first and second images. In addition, the amount-of-feature detection section 21 can detect, as the second amounts of features, color gamuts contained in the first and second images. The second amount of features represents a frequently detected color gamut that is common to the first and second images. The amount-of-feature detection section 21 also extracts color gamuts in which values obtained by accumulating, for respective color gamuts of the first image and the second image, color-gamut chromaticities detected for respective pixels included in the first image and the second image are larger than corresponding predetermined thresholds. The extracted color gamuts correspond to gamuts extracted as feature portions in the first image 31 and the second image 32. The elimination-area detection section 22 then eliminates, in the second image 32, an area corresponding to the color gamut that is common to the feature portions of first image 31 and the second image 32.

For example, there are cases in which the color of ground of subjects contained in the first and second images occupies a largest area on the screen. In such a case, since the ground portion has no motion, no motion vector is generated. In this case, an area (e.g., a ground portion) in which the scalar quantity of the motion vector is zero can be said to have a most-frequent value of motion vectors that the amount-of-feature detection section 21 recognizes as an amount of features. With respect to the area having the most-frequent value of the motion vectors, a sub image from which the color gamut thereof is eliminated can be superimposed on the main image. In addition, recognizing the most frequent value of the motion vectors as the first amount of features and recognizing the color gamut as the second amount of features can enhance the accuracy of detecting an elimination area.

The above-described image processing apparatus 10 according to the first embodiment of the present invention allows a main image and a sub image to be selected from images captured by multiple cameras and allows the main image and the second image to be freely superimposed. In this case, an image to be superimposed can be selected, and operations for, for example, changing the zoom ratio and cutting out a selected image, can be performed. Thus, the viewer can view the entire image while intensively looking at one portion (he or she wishes to view) on the screen.

When multiple images are displayed in an aligned manner in divided areas on the screen, as in the related art, the user can only view the images that are smaller in size than their original image. However, when images are superimposed as in the embodiment of the present invention, there is no need to reduce the sizes of the images. The present invention, therefore, has an advantage in that it is possible to display even multiple images without impairing the vigorous main image.

Furthermore, since a redundant common portion of multiple images is eliminated, the viewer can institutively understand the contents of the individual images even when the images are superimposed. Also, since an important portion can be shown on top on the superimposed image, there is an advantage in that an image on which the image is superimposed can also be seen without a large area thereof being hidden.

A sub image is superimposed on only a portion located in the main image and specified by the user (or designated by the image processing apparatus). Thus, compared to a case in which two images are arranged in parallel for comparison, it is easy to compare images that are captured from different angles. There is also an advantage in that when multiple images are superimposed with a time difference, it is possible to clearly understand time-related changes.

An image processing apparatus 40 according to a second embodiment of the present invention will now be described with reference to FIGS. 16 and 17.

The image processing apparatus 40 cuts out a portion of one image input from the first camera, zooms in the cut out portion, and generates a composite image from the zoomed-in image and the original image. In FIG. 16, sections corresponding to those in FIG. 2 which were described above in conjunction with the first embodiment are denoted by the same reference numerals, and detailed descriptions thereof are not given hereinafter.

The image processing apparatus 40 includes a storage section 11, an image superimposition section 41, and an external-signal input section 13. The image superimposition section 41 includes a sub-image cutout section 42, an amount-of-feature detection section 21, an elimination-area detection section 22, and an image combination section 23. The sub-image cutout section 42 cuts out, as a sub image, part of image data read from the storage section 11. A user operation information input from the external-signal input section 13 is supplied to the sub-image cutout section 42, the elimination-area detection section 22, and the image combination section 23.

When the image data read from the storage section 11 is only one image, the user first selects a portion of interest. This portion of interest is an image obtained by zooming in a portion of the image. The sub-image cutout section 42 enlarges the partial image cut out from the main image captured by the first camera 3 and supplies, as a second image, the enlarged image to the amount-of-feature detection section 21.

The amount-of-feature detection section 21 determines a most-frequent color gamut in the selected portion of interest and the original image. The elimination-area detection section 22 eliminates a common portion of the images, the most-frequent color gamut being common to both the images. The image combination section 23 then combines the main image with the zoomed-in partial image. During creation of a composite image from the same image, when any object of interest is not particularly specified, coordinates selected by the user are reflected to determine a superimposition position.

FIG. 17 illustrates an example of image processing performed by the image processing apparatus 40.

Image (a) in FIG. 17 shows an example of an original image 51.

The original image 51 contains multiple people. In the original image, an area in which a person or people selected by the user is assumed to be an image 52 of interest.

Image (b) in FIG. 17 shows an example of a zoomed-in image 53 obtained by processing the image 52 of interest.

The image 53 of interest contains enlarged people.

Image (c) in FIG. 17 shows an example of a composite image 54 obtained by superimposing and combining the zoomed-in image 53 with the original image 51.

The zoomed-in image 53 is superimposed on the original image 51 to thereby create the composite image 54. As a result, the user can view the image 52 of interest on one screen with only the image 52 being zoomed in, while viewing the surroundings of the image 52.

According to the second embodiment described above, a portion of one image is zoomed and the zoomed-in portion can be displayed superimposed on the original image. Thus, the user can select an operation for time-sequentially displaying multiple different images in a superimposed manner. Consequently, the user can observe, on the same screen, events that occur at multiple times. In addition, the main image and the sub image can be superimposed with varied playback speeds thereof. Since identical objects can also be displayed superimposed, the amount of motion of the line of vision is reduced during viewing of two images so that the user can simultaneously recognize important portions.

Superimposition of a zoomed-in image on an entire image facilitates that the use can simultaneously understand overall information while viewing the detailed zoomed-in image. Even for a single image, by superimposing a sub image, obtained by processing a portion of an original image, on the original image, the user can view more details of a portion he or she wishes to view. For example, during display on a large screen, multiple images of interest can be cut out and superimposed on an original image. As a result, visibility of the images improves.

The present invention is not limited to the above-described embodiments. For example, even for images captured at different times, the user can observe a difference between actions on different dates by displaying the images in a superimposed manner. Also, with respect to images that are captured at different places, the user can view the images on the single screen. For example, by superimposing only an important portion of a game played at another sport arena on an image that the user particularly wishes to view, he or she can watch two games at the same time. Another example of application is superimposition display on a surveillance monitor. The present invention is also applicable to security by displaying, in a superimposed manner, a zoomed-in image showing an intruder or the like on a panned image captured with a larger field of view.

The elimination-area detection section 22 may also regards, as a common color gamut to be eliminated from the second image, a color gamut in which a value by accumulating, for each color gamut, color-gamut chromaticities in a predetermined color coordinate system, the chromaticities being detected for each pixel included in the first image, is greater than a predetermined threshold. This arrangement makes it possible to combine the second image with the first image so that it looks natural, while utilizing the color gamut contained in the first image.

The series of processing in the above-described embodiments can be executed by hardware or software. When the series of processing is executed by software, a program included in the software is executed by installing it to, for example, a computer incorporated in dedicated hardware or to a general-purpose personal computer that is capable of executing various functions through installation of various programs.

Needless to say, the series of processing can also be achieved by supplying a storage medium storing software program code for accomplishing the features of the above-described embodiments to the system or apparatus so that the computer (or a control device, such as a CPU) of the system or apparatus reads and executes the program code.

Examples of the storage medium for supplying the program code include a floppy disk, hard disk, optical disc, magneto-optical disc, CD-ROM, CD-R, magnetic tape, non-volatile memory card, and ROM.

In addition, not only is the program code that is read from the computer executed to achieve the features of the above-described embodiments, but also an OS (operating system) or the like that is running on the computer may perform part or all of the actual processing in accordance with instructions of the program code to achieve the features of the embodiments.

Herein, the steps for describing the program included in the software not only include processing that is time-sequentially performed according to the described sequence, but also include processing that is concurrently or individually executed without being necessarily time-sequentially processed.

The present application contains subject matter related to that disclosed in Japanese Priority Patent Application JP 2008-097509 filed in the Japan Patent Office on Apr. 3, 2008, the entire content of which is hereby incorporated by reference.

The present invention is not limited to the above-described embodiments, and it goes without saying that various other configurations are also possible without departing from the spirit and scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    an amount-of-feature detection section configured to determine an amount of features of a first image and an amount of features of a second image, the first image and the second image containing the same subject and one of the first image and the second image corresponding to a first scene and the other of the first image and the second image corresponding to a second scene within a smaller area of the first scene;
    a memory configured to store the first image and the second image containing the same subject;
    an elimination-area detection section configured to eliminate, from the second image, an area in which the amount of features extracted by the amount-of-feature detection section is larger than a predetermined threshold and to provide the second image in which the eliminated area is transparent; and
    an image combination section configured to superimpose the second image, in which the eliminated area is transparent, on the first image, wherein
    the amount-of-feature detection section
        detects, as the amount of features, color gamuts contained in the first image and the second image and represented by a predetermined color coordinate system;
        determines a frequently detected color gamut that is common to the first image and the second image; and
        extracts, as feature portions in the first image and the second image, color gamuts in which values obtained by accumulating, for the respective color gamuts of the first image and the second image, color-gamut chromaticities detected for respective pixels included in the first image and the second image are larger than corresponding predetermined thresholds; and
    the elimination-area detection section eliminates, in the second image, an area corresponding to the color gamut that is common to the feature portions of the first image and the second image.

2. The image processing apparatus according to claim 1, further comprising:
    an image cutout section configured to cut out a partial image from the first image, enlarges the partial image, and supplies the enlarged partial image to the amount-of-feature detection section as the second image.

3. The image processing apparatus according to claim 2, wherein
    the first image is a panned image of the subject and the second image is a zoomed-in image of the subject contained in the first image.

4. The image processing apparatus according to claim 1, wherein
    the elimination-area detection section determines, as the common color gamut to be eliminated from the second image, the color gamut in which the value obtained by accumulating, for the respective color gamuts, the color-gamut chromaticities detected for the respective pixels included in the first image is larger than the corresponding predetermined threshold.

5. The image processing apparatus according to claim 1, wherein
    the color gamuts determined by the amount-of-feature detection section, the predetermined thresholds, and the area eliminated by the elimination-area detection section are determined on a basis of an input from an operation section.

6. The image processing apparatus according to claim 1, wherein
    a position of the second image relative to the first image, the second image being superimposed on the first image by the image combination section, is determined on a basis of an input from an operation section.

7. The image processing apparatus according to claim 1, wherein
the amount-of-feature detection section further detects, as the amount of features, the amount of motion of the subject contained in the first image and the second image and determines a frequently detected amount of motion that is common to the first image and the second image, and
the elimination-area detection section eliminates a background area of a subject object having the amount of motion detected by the amount-of-feature detection section.

8. An image processing apparatus comprising:
an amount-of-feature detection section configured to determine an amount of features of a first image and an amount of features of a second image, the first image and the second image containing the same subject and one of the first image and the second image corresponding to a first scene and the other of the first image and the second image corresponding to a second scene within a smaller area of the first scene;
a memory configured to store the first image and the second image containing the same subject;
an elimination-area detection section configured to eliminate, from the second image, an area in which the amount of features extracted by the amount-of-feature detection section is larger than a predetermined threshold and to provide the second image in which the eliminated area is transparent; and
an image combination section configured to superimpose the second image, in which the eliminated area is transparent, on the first image, wherein
the amount-of-feature detection section detects, as the amount of features, the amount of motion of the subject contained in the first image and the second image and determines a frequently detected amount of motion that is common to the first image and the second image,
the elimination-area detection section eliminates a background area of a subject object having the amount of motion detected by the amount-of-feature detection section, and
a position of the second image relative to the first image, the second image being superimposed on the first image by the image combination section, is determined on a basis of the motion of the subject contained in the first image.

9. The image processing apparatus according to claim 1, wherein
after the elimination-area detection section eliminates the area in which the amount of features extracted is larger than the predetermined threshold, the eliminated area is made transparent.

10. An image processing method of an image processing apparatus, the method comprising the steps of:
determining, by a processor of the image processing apparatus, an amount of features of a first image and an amount of features of a second image, the first image and the second image containing the same subject and one of the first image and the second image corresponding to a first scene and the other of the first image and the second image corresponding to a second scene within a smaller area of the first scene;
eliminating from the second image, an area in which the amount of features is larger than a predetermined threshold and providing the second image in which the eliminated area is transparent; and
superimposing the second image in which the eliminated area is transparent on the first image, wherein
the determining includes:
detecting, as the amount of features, color gamuts contained in the first image and the second image and represented by a predetermined color coordinate system;
determining a frequently detected color gamut that is common to the first image and the second image; and
extracting, as feature portions in the first image and the second image, color gamuts in which values obtained by accumulating, for the respective color gamuts of the first image and the second image, color-gamut chromaticities detected for respective pixels included in the first image and the second image are larger than corresponding predetermined thresholds; and
the eliminating includes eliminating, in the second image, an area corresponding to the color gamut that is common to the feature portions of the first image and the second image.

11. A non-transitory computer-readable storage medium having a computer-readable program stored therein that when executed by a computer causes the image processing apparatus to execute processing of the image processing method according to claim 10.

* * * * *